July 3, 1962 M. W. DAVIS Re. 25,196

KNIFE RACK

Original Filed Feb. 5, 1957

Murray W. Davis
INVENTOR.

BY Clarence A. O'Brien and Harvey B. Jacobson
Attorneys

United States Patent Office

Re. 25,196
Reissued July 3, 1962

25,196
KNIFE RACK

Murray W. Davis, 230 Frances Ave., Flushing, Mich.

Original No. 2,924,410, dated Feb. 9, 1960, Ser. No. 638,303, Feb. 5, 1957. Application for reissue Oct. 24, 1960, Ser. No. 64,688
5 Claims. (Cl. 248—37.6)

Matter enclosed in heavy brackets [ ] appears in the original patent but forms no part of this reissue specification; matter printed in italics indicates the additions made by reissue.

My invention relates to improvements in knife racks for kitchen and like use.

The primary object of my invention is to provide a knife rack adapted to be inserted into a rectangular recess in a wall over a bottom kitchen cabinet or the like and which will hold a number of knives in vertical position with the handles exposed to view and readily accessible for grasping to select a knife and with the blades concealed behind a wall out of reach of small children and protected against casual damaging contact therewith.

Another object is to provide a knife rack as in the foregoing which is easy to install and remove for cleaning and which provides a recessed in wall fixture substantially flush with the wall and is adapted for manufacture at a very low cost.

These together with the other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
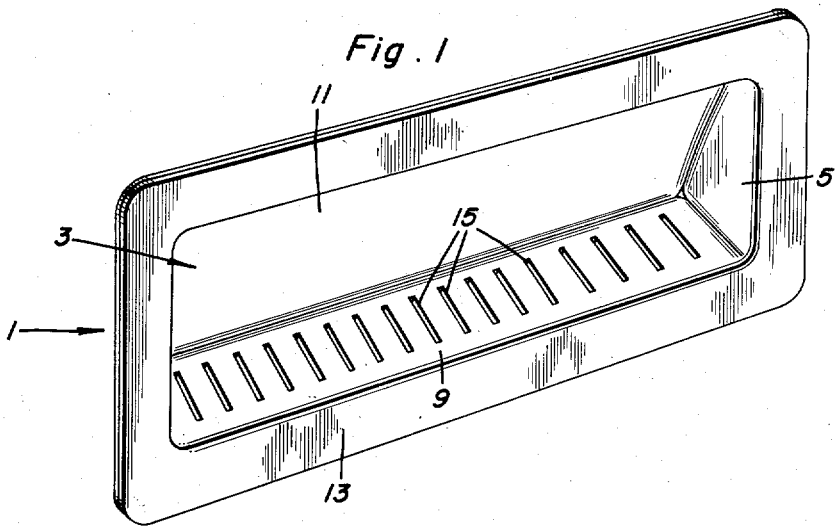
FIGURE 1 is a view in perspective of my improved knife rack in a preferred embodiment thereof detached.

Referring to the drawing by numerals, as shown therein my improved rack, designated generally by the numeral 1, comprises an elongated, rectangular, dished receptacle 3 of resilient plastic or the like open at its front and having vertical end walls 5, a horizontal top wall 7, an upwardly and rearwardly inclined bottom wall 9, and a downwardly and rearwardly inclined back wall 11. A lateral external flange 13 surrounds the front of the receptacle 3.

Figure 2:
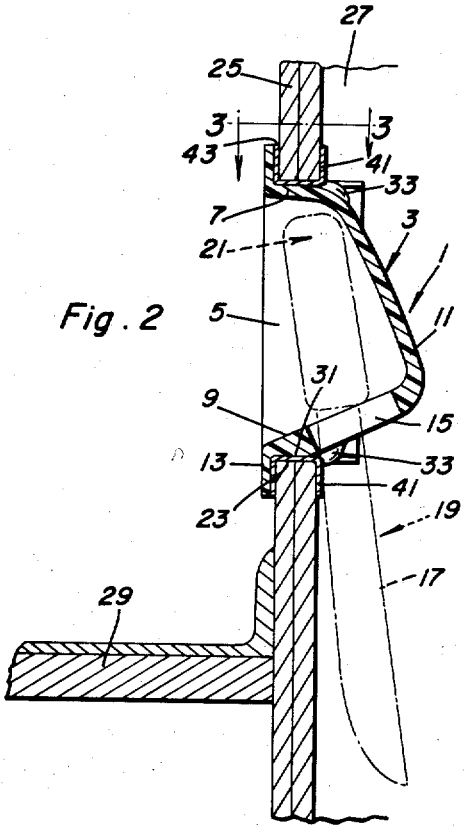
FIGURE 2 is a fragmentary view in vertical section of the knife rack recessed into a wall.
Figure 3:
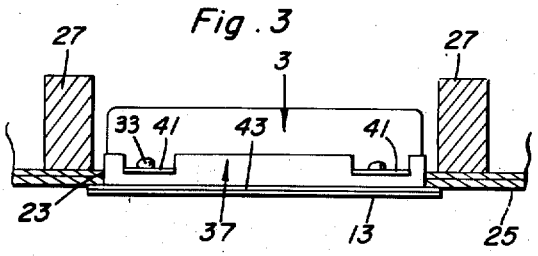
FIGURE 3 is a fragmentary view in horizontal section partly in plan taken on the line 3—3 of FIGURE 2 and drawn to a smaller scale with parts of the wall eliminated.
Figure 4:
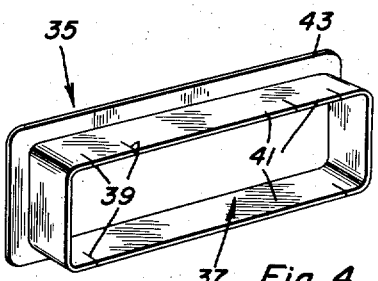
FIGURE 4 is a view in perspective of a liner for the opening in the wall drawn to a smaller scale.

A series of transverse slots 15 are provided in the bottom wall 9 and are laterally spaced apart along said wall to receive the blades 17 of knives, as at 19, inserted downwardly through said slots, with the handles 21 of the knives resting on the bottom wall 9, as shown in broken lines in FIGURE 2, and said handles positioned within the receptacle 3.

The receptacle 3 is proportioned for insertion rearwardly in an elongated rectangular opening 23 in a wall 25, between wall studding 27, and over a kitchen cabinet 29 or the like, with the flange 13 limiting such insertion to prevent the receptacle 3 from falling rearwardly through the opening. As best shown in FIGURE 2, the slots 15 are spaced from the front of the receptacle 3 so that they lie behind the wall 25, whereby the blades 17 are disposed behind said wall and not accessible to children or not liable to be damaged by contact with articles being handled at the cabinet or otherwise.

Preferably the bottom wall 9 is formed with a horizontal flat portion 31 between flange 13 and the series of slots 15 and which, together with the top wall 7, are adapted to lie parallel with horizontal top and bottom edges of an opening 23 in the wall.

Protruding top and bottom detent knobs 33 are formed on the receptacle, preferably adjacent the end walls 5 at the juncture of the top and back walls 7, 11 and on the bottom wall 9 and are spaced from the flange 13 to snap behind the wall 25 and frictionally hold the receptacle in place in the opening 23 when said receptacle is pressed rearwardly into said opening.

Preferably a liner 35 of soft bendable tin or the like is provided in the opening 23 in case the wall is of too soft material. The liner 35 comprises a rectangular band 37 of a size to fit in the opening 23 and which is slit at selected points, as at 39, and bent between the slits to form tabs 41 engaging behind the wall 25, the band 37 having a surrounding front flange 43 fitting flat against the front of the wall 25 to be held in place by the flange 13 fitting flat against the same.

When using the liner 35, it is first positioned in the opening 23 and the tabs 41 bent against the rear side of the wall 25. The receptacle 3 is then pressed rearwardly through the liner 35, and because of the resiliency of said receptacle 3, the knobs 33 will snap behind the tabs 41 and hold the receptacle 3 in place, with the flange 13 flat against the flange 41, all as best shown in FIGURE 2.

The liner 35 may be dispensed with in the case of a sufficiently hard wall and the receptacle 3 inserted through the opening 23 with the knobs 33 snapping behind the wall 25.

As will be clear, the described inclination of the bottom wall 9 tends, when the knife handles 21 are resting thereon, to tilt said handles forwardly for easy grasping thereof, and to tilt the knife blades 17 rearwardly away from the liner 35 or wall 25, as the case may be. Also, the inclination of the bottom wall 9 similarly inclines the slots 15 to render the same readily visible and accessible for inserting knife blades therethrough.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

*1.* A knife rack comprising an open front resilient receptacle adapted to be inserted in an opening in a room wall and having top and back walls, respectively, and a bottom wall provided with transverse laterally spaced slots therein opening through said bottom wall for receiving knife blades inserted downwardly therethrough below said bottom wall with the knife handles resting on said bottom wall, said slots being spaced from the front of the receptacle to space the blades behind a room wall when said receptacle is inserted in an opening in a room wall, said receptacle having an external front lateral flange adapted to lie in front of a room wall to prevent the receptacle from falling rearwardly through the opening and being dished and of sufficient depth for positioning of said handles therein in the rear of its open front, and knobs on said top and bottom walls for snapping behind a room wall for retaining the receptacle in an opening in a wall.

*2. A knife rack comprising an open front resilient receptacle adapted to be inserted in an opening in a room wall and having top and back walls, respectively, and a bottom wall provided with transverse laterally spaced slots therein opening through said bottom wall for receiving knife blades inserted downwardly therethrough below said bottom wall with the knife handles resting on said bottom wall, said slots being spaced from*

*the front of the receptacle to space the blades behind a room wall when said receptacle is inserted in an opening in a room wall, said recetacle having an external front lateral flange adapted to lie in front of a room wall to prevent the receptacle from falling rearwardly through the opening and being dished and of sufficient depth for positioning of said handles therein in the rear of its open front, and means on said top and bottom walls for snapping behind a room wall for retaining the receptacle in an opening in a wall.*

*3. A knife rack comprising an open front resilient receptacle adapted to be inserted in an opening in a room wall and having top and back walls, respectively, and a bottom wall provided with transverse laterally spaced slots therein opening through said bottom wall for receiving knife blades inserted downwardly therethrough below said bottom wall with the knife handles resting on said bottom wall, said slots being spaced from the front of the receptacle to space the blades behind a room wall when said receptacle is inserted in an opening in a room wall, said receptacle having an external front lateral flange adapted to lie in front of a room wall to prevent the receptacle from falling rearwardly through the opening and being dished and of sufficient depth for positioning of said handles therein in the rear of its open front, and knobs on said receptacle spaced rearwardly from the flange for snapping behind a room wall for retaining the receptacle in an opening in a wall.*

*4. A knife rack comprising an open front receptacle adapted to be inserted in an opening in a room wall and having top walls, end walls, and back walls, respectively, and a bottom wall provided with transverse laterally spaced slots therein opening through said bottom wall for receiving knife blades inserted downwardly therethrough below said bottom wall with the knife handles resting on said bottom wall, said slots being spaced from the front of the receptacle to space the blades behind a room wall when said receptacle is inserted in an opening in a room wall, said receptacle having an external front lateral peripheral Yange adapted to lie in front of a room wall to prevent the receptacle from falling rearwardly through the opening and being dished and of sufficient depth for positioning of said handles therein in the rear of its open front, and means on said receptacle for engaging the room wall and holding the peripheral flange in position on the front of the room wall for retaining the receptacle in an opening in the room wall.*

*5. A knife rack comprising an open front receptacle adapted to be inserted in an opening in a room wall and having top walls, end walls and back walls, respectively, and a bottom wall provided with transverse laterally spaced slots therein opening through said bottom wall for receiving knife blades inserted downwardly therethrough below said bottom wall with the knife handles resting on said bottom wall, said slots being spaced from the front of the receptacle to space the blades behind a room wall when said receptacle is inserted in an opening in a room wall, said receptacle having an external front lateral peripheral flange adapted to lie in front of a room wall to prevent the receptacle from falling rearwardly through the opening and being dished and of sufficient depth for positioning of said handles therein in the rear of its open front, said knobs on said top and bottom walls for snapping behind a room wall for retaining the receptacle in an opening in a wall.*

References Cited in the file of this patent or the original patent

UNITED STATES PATENTS

| | | |
|---|---|---|
| 1,323,950 | Bauer | Dec. 2, 1919 |
| 1,536,906 | Miller | May 5, 1925 |
| 1,746,503 | Timmons | Feb. 11, 1930 |
| 1,876,828 | Ashfield | Sept. 12, 1932 |
| 2,118,665 | Churchill | May 24, 1938 |
| 2,183,074 | Hopkins | Dec. 12, 1939 |
| 2,775,093 | Kundert | Dec. 25, 1956 |